(12) United States Patent
Kiely

(10) Patent No.: US 7,071,410 B1
(45) Date of Patent: Jul. 4, 2006

(54) PROTECTIVE SHIELD FOR UTILITY SUPPLYING TUBES, CABLES AND CONDUITS

(75) Inventor: Kenneth M. Kiely, Milford, CT (US)

(73) Assignee: Bridgeport Fittings, Inc., Stratford, CT (US)

( * ) Notice: Subject to any disclaimer, the term of this patent is extended or adjusted under 35 U.S.C. 154(b) by 0 days.

(21) Appl. No.: 11/100,798

(22) Filed: Apr. 6, 2005

(51) Int. Cl.
*H01B 7/29* (2006.01)

(52) U.S. Cl. .......................... 174/36; 174/135
(58) Field of Classification Search ........... 174/36, 174/135, 35 R; 248/65, 68.1
See application file for complete search history.

(56) References Cited

U.S. PATENT DOCUMENTS

| | | | | |
|---|---|---|---|---|
| 877,442 A | * | 1/1908 | Mast ........................ | 174/133 R |
| 1,784,217 A | * | 12/1930 | Berry ...................... | 174/117 F |
| 1,818,625 A | * | 8/1931 | Hunter ...................... | 248/74.3 |
| 3,349,405 A | * | 10/1967 | Wright ...................... | 343/702 |
| 4,787,583 A | * | 11/1988 | Morton ........................ | 248/55 |
| 5,163,254 A | * | 11/1992 | Zastrow et al. ................ | 52/27 |
| 6,010,099 A | * | 1/2000 | Wertz et al. .................. | 248/55 |

* cited by examiner

*Primary Examiner*—Chau N. Nguyen
(74) *Attorney, Agent, or Firm*—Melvin I. Stoltz

(57) ABSTRACT

By providing a continuous, elongated strip of material, which comprises an arcuately curved section in combination with at least one flange section extending outwardly from the curved section, an efficient, easily manufactured, and readily installed protector shield is realized. By employing the shield construction of the present invention, any desired tube, pipe, conduit or cable, such as a non-metallic electrical power carrying cable, is capable of being completely surrounded by a protective shield which is affixed directly to any support wall, such as a concrete or cinder block wall, with both ease and convenience. In addition, numerous other tubes, cables, and conduits, such as water carrying tubes, low-voltage cables, signal carrying cables, and other utility tubes, pipes, and conduits are capable of being similarly protected.

12 Claims, 2 Drawing Sheets

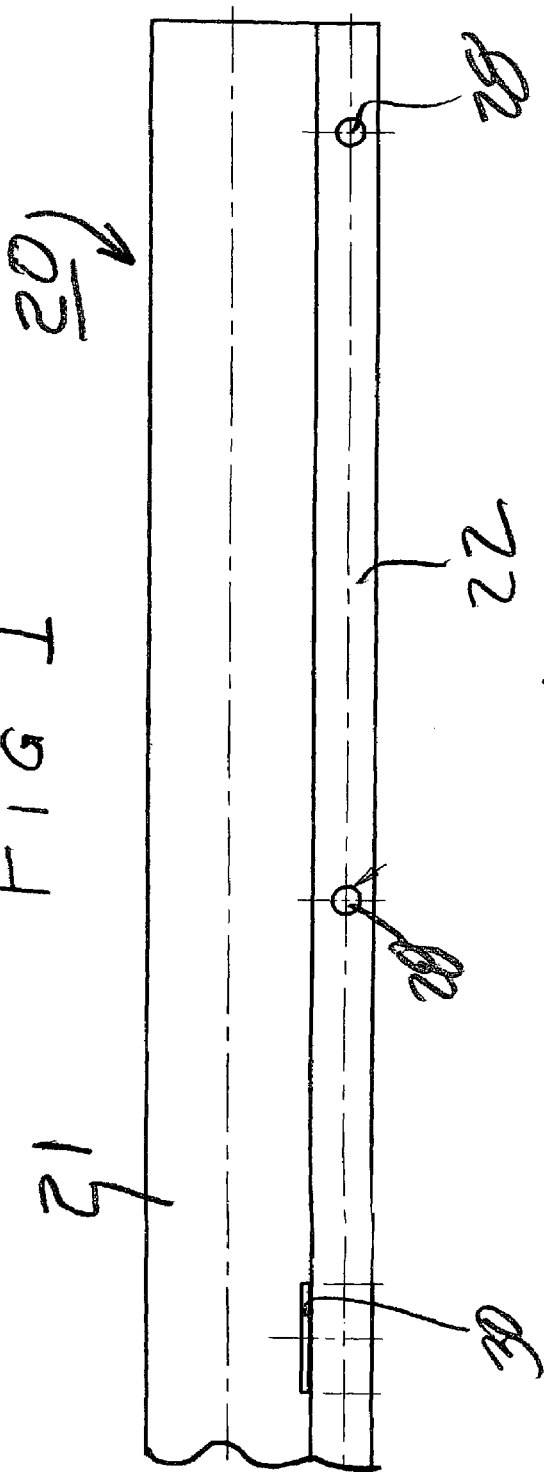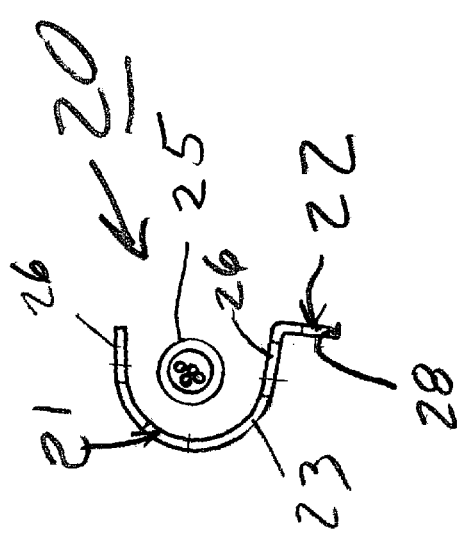

PROTECTIVE SHIELD FOR UTILITY SUPPLYING TUBES, CABLES AND CONDUITS

TECHNICAL FIELD

This invention relates to the installation of utility distribution systems in homes and businesses and, more particularly, to the installation of non-metallic electricity carrying cables installed in homes and businesses.

BACKGROUND ART

In the field of utility distribution systems in homes and buildings, whether for new construction or for improvements or expansion, substantial development and product improvements have been made. Typically, these improvements are directed to enabling installers to securely mount any desired utility to any desired location in the most efficient and quickest manner.

In particular installations or locations, various cables, conduits, pipes and tubing must be interconnected to each other, as well as connected to a primary supply. Although each utility has different construction details and distribution problems, power distribution is particularly unique, with electricity carrying cables presenting the greatest safety challenges and concerns. In the distribution of electricity, a suitable power distributing outlet box, junction box, or other enclosure is employed with the installed network interconnected therewith. In each of the installations, flexible metal conduits, armored or metal clad cables, or non-metallic cables, within which the electrical power carrying wires are contained, must be securely mounted throughout the entire home or building being constructed. Depending upon the building codes and the building standards employed in any particular location, the mounting of non-metallic cables to desired locations may be achieved in a wide variety of alternate ways.

Typically, in most locations where employed, nonmetallic electrical power carrying cables are mounted directly to the wood studs which are employed in the support frames of the home or building. In this way, these nonmetallic cables are protected from unwanted contact or puncture during the building construction, particularly when sheet rock or other wall forming materials are mounted to the wood studs.

In constructing many buildings in particular locations where local problems exist, such as high groundwater and/or termite infestations, wood studs are not used for framing the building or house being constructed. Instead, poured concrete or cinder blocks are employed for forming the walls, with thin, wood strings, called furring strips, being mounted to the cinder block or concrete to enable interior wall-forming panels to be affixed thereto. As a result, nonmetallic electrical power carrying cables must be mounted directly to the concrete and/or cinder blocks in order to enable the cables to extend throughout the building.

In most such installations, the direct mounting of nonmetallic cables to cinder blocks and/or concrete forming walls is achieved by employing a simple bracket which peripherally surrounds the cable and allows a suitable nail or fastener to be driven through the bracket for affixing the bracket and the cable to the cinder block or concrete. Although this method is extremely effective in enabling the nonmetallic cables to be mounted in any desired location, substantial difficulties have occurred due to the complete exposure of the nonmetallic cable throughout its entire length.

In a typical installation, these nonmetallic cables extend in a wide variety of alternate locations throughout the building or home, with only the small holding bracket being mounted to the cable at widely dispersed locations. In addition, the interior wall forming panels, which are mounted to the furring strips affixed to the cinder block or concrete walls, effectively cover and conceal the network of nonmetallic cables mounted to the cinder block/concrete walls.

As result, when any decorative items are secured to the wall forming panels, the likelihood exists that one or more of the nonmetallic cables will be pierced by a nail or other holding member, causing potential damage and harm to the occupants. In spite of this potential harm and danger which exists, no prior art system has been developed which is capable of protecting owners or occupants of a building from accidentally piercing the nonmetallic cables mounted in their home or building.

Similarly, other, non-electrical utility-bearing pipes, tubes or conduits are mounted directly to the cinder block or concrete walls. These tubes, pipes and conduits are employed for low-voltage cables, television and satellite cables, and the like. Typically, these tubes, pipes, and conduits are formed from plastic, copper, or other similar material. However, without any protection being employed, these tubes, pipes or conduits are also frequently pierced by nails or other fasteners when the homeowner is decorating the interior walls.

Therefore, it is a principal object of the present invention to provide a protective shield or plate constructed for being placed in overlying relationship with utility supplying tubes, pipes, and conduits, such as nonmetallic, electrical power carrying cables, water carrying tubes or conduits, low-voltage cables, signal carrying cables and the like.

Another object to the present invention is to provide a protective shield or plate for utility supplying tubes, cables, and conduits having the characteristic features described above, which is quickly and easily installed in any desired location, directly to the support surface on which the cable, conduit, and/or tube is mounted.

Another object to the present invention is to provide a protective shield for utility supplying tubes, cables, and conduits having the characteristic features described above, which is capable of being quickly and easily affixed to concrete and/or cinder block walls.

Another object to the present invention is to provide a protective shield for utility supplying tubes, cables and conduits having the characteristic features described above, which is capable of virtually enclosing the utility supplying tube, cable, and conduit and effectively preventing any fastening member from being driven into the tube, cable or conduit.

Other and more specific objects will in part be obvious and will in part appear hereinafter.

SUMMARY OF THE INVENTION

By employing the present invention, all of the difficulties and drawbacks of the prior art have been overcome, and an efficient, easily manufactured, and readily installed protector shield is realized. As detailed herein, using the shield construction of the present invention, any desired tube, pipe, conduit or cable, such as a non-metallic electrical power carrying cable, is capable of being completely surrounded by a protective shield which is affixed directly to any support wall, such as a concrete or cinder block wall, with both ease and convenience. In addition, numerous other tubes, cables, and conduits, such as water carrying tubes, low-voltage cables, signal carrying cables, and other utility tubes, pipes, and conduits are capable of being similarly protected. In this way, any desired portion of any utility bearing cable, tube, pipe, and/or conduit as well as the entire length of the utility bearing tube, cable, pipe, or conduit is capable of being peripherally surrounded and protected from being accidentally pierced or punctured by nails or other fastening members.

In a preferred embodiment of the present invention, the protector shielding member comprises a continuous, elongated strip of material, preferably metal, which comprises an arcuately curved section in combination with at least one flange section extending outwardly from the curved section. In this way, the arcuately curved section is quickly and easily placed in juxtaposed, spaced, overlying, protecting relationship with the nonmetallic tube, cable, pipe and/or conduit, while the flange section, which incorporates mounting holes formed therein, is employed for affixing the shield member directly to the cinder block and/or concrete wall. In this way, the entire length of the shield member, when mounted in position, provides an immediate protection to the nonmetallic tube, cable, pipe, and/or conduit retained therein, effectively preventing any nail or other fastening member from piercing or puncturing the nonmetallic cable, tube, pipe, or conduit.

In the preferred construction, the shield member is formed from galvanized, cold, rolled steel, in order to assure that the desired protection is provided to the nonmetallic cable, tube, pipe and/or conduit. However, any other suitable material which will provide substantially the same level of protection can be employed with equal efficacy.

In an alternate embodiment of the present invention, two flange sections are employed, with separate flange sections extending from opposed terminating ends of the arcuately curved section. In this way, an additional mounting strip is provided, assuring secure, mounted affixation of the shield member directly to the support wall, with the nonmetallic cable, tube, pipe and/or conduit peripherally surrounded and protected within the curved section.

The invention accordingly comprises an article of manufacture possessing the features, properties, and relation of elements which will be exemplified in the article hereinafter described, and the scope of the invention will be indicated in the claims.

THE DRAWINGS

For a fuller understanding of the nature and objects of the invention, reference should be had to the following detailed description taken in connection with the accompanying drawings, in which:

FIG. 1 is a top plan view of one embodiment of the shield member of the present invention;

FIG. 2 is an end view of the shield member of FIG. 1;

DETAILED DISCLOSURE

Figures 3, 4:
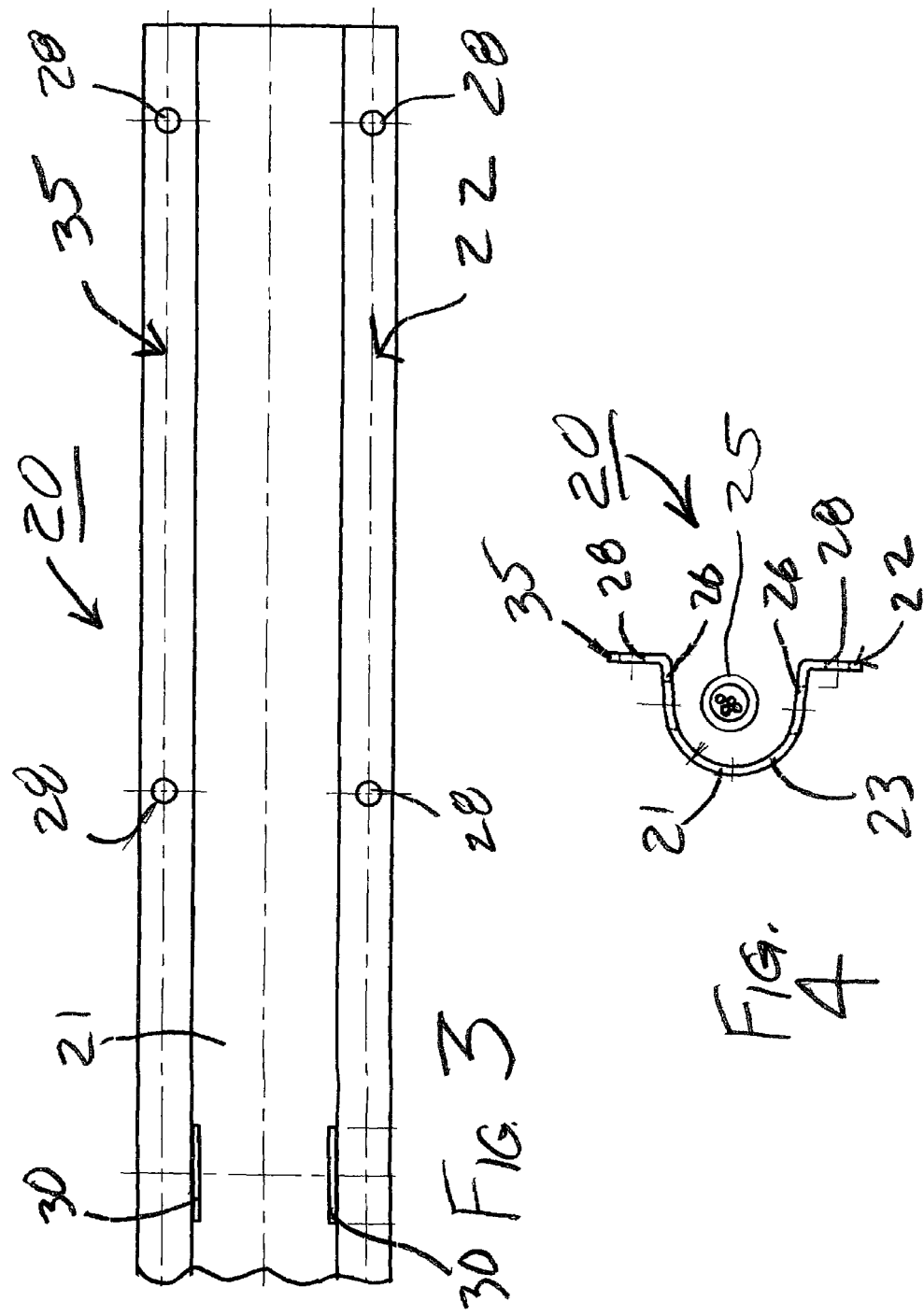
FIG. 3 is a top plan view of a second embodiment of the shield member of the present invention.
FIG. 4 is an end view of the shield member of FIG. 3.

By referring to FIGS. 1–4, along with the following detailed discussion, the construction of protector shield member 20 of the present invention can best be understood. In this regard, although two alternate embodiments of the present invention are depicted and detailed herein, further alternate embodiments of the present invention can be implemented without departing from the scope of the present invention. Consequently, it is to be understood that FIGS. 1–4, and the following detailed discussion, are provided for exemplary purposes only, and are not intended as a limitation of the present invention.

Throughout the following detailed discussion, the overall construction and operation of protector shield member 20 of the present invention is detailed in reference to its use in peripherally surrounding and protecting non-metallic, electricity carrying cables and preventing unwanted damage and danger which may occur from having such cables punctured or contacted by nails and other fastening members by any individual mounting an item to a wall. However, it is the understood that the peripheral surrounding and protection provided by shield member 20 of the present invention is equally applicable to other utility carrying tubes, conduits, pipes, and cables, such as water tubes and pipes, low-voltage cables, television and video signal carrying cables, entertainment media cables, and the like. Although the following disclosure focuses on non-metallic, electricity carrying cables, all other utility carrying tubes, conduits, pipes, and cables are equally applicable for use with the present invention for enjoying a virtually identical benefit.

In FIGS. 1 and 2, one embodiment of shield protector plate 20 is shown, wherein shield protector plate 20 comprises arcuately curved section 21 and flange section 22. As depicted, arcuately curved section 21 comprises a generally C-shape, with flange section 22 extending from one terminating end of curved section 21.

In the preferred construction of this embodiment of the present convention, shield protector plate 20 is formed as a single, fully integrated component, with shield protector plate 20 comprising a single, longitudinally extending member. Although the overall length of shield protector plate 20 may be widely varied, depending upon a desired end use, it has been found that the overall preferred length for shield protector plate 20 of the present invention ranges between about 2 feet and 3 feet. In this way, the extended length of any non-metallic, electricity carrying cable can be peripherally surrounded and protected easily and efficiently.

In FIGS. 1 and 2, a generally conventional, non-metallic, electricity carrying cable 25 is depicted in order to provide a full and complete understanding of the construction and operation of shield protector plate 20 of the present invention. As is well known in the art, non-metallic, electricity carrying cables 25 are generally constructed as substantially flat elongated cables, which are peripherally surrounded by plastic material and incorporate a plurality of electrically conducting wires embedded therein. Since cable 25 is typically constructed in a uniform size and shape, regardless of the particular manufacturer for cable 25, shield protector plate 20 of the present invention may comprise a single, universal shape which is capable of being employed with any brand of cable 25.

In this regard, arcuately curved section 21 of shield protector plate 20 preferably comprises a diameter ranging between about 0.6 and 0.8 inches. Although any desired dimension can be employed, it has been found that dimensions of this nature can be employed with virtually any non-metallic, electricity carrying cable 25, as well as all other utility carrying cables, tubes, and conduits.

In the preferred construction, arcuately curved section 21 comprises a generally uniform radius portion 23 in combination with substantially flat extensions 26, 26 which are integrally interconnected with the radius portion 23 and extend from the terminating end of radius portion 23 in a generally continuous construction. By constructing arcuately curved section 21 in this manner, with uniform radius portion 23 comprising an integral, major portion thereof, with an overall dimension which enables shield protector plate 20 to be easily positioned in juxtaposed, overlying, spaced relationship with nonmetallic, electricity carrying cable 25. In this way, whenever shield protector plate 20 is installed in place, any nail or other fastening member which may be driven through the interior wall of the building towards cable 25 will be immediately diverted away, preventing any penetration of shield protector plate 20 and/or non-metallic, electricity carrying cable 25.

In addition, in the preferred construction, shield protector plate 20 incorporates flange section 22 radially extending outwardly from one terminating end of curved section 21. In addition to longitudinally extending the entire length of curved section 21, flange section 22 incorporates a plurality of apertures 28 formed therein. Although any desired spaced distance can be employed between apertures 28, it has been found that a spacing of between 3 and 4 inches is most desirable.

By incorporating apertures 28 in flange section 22, an easily employed and readily accessible nail or fastener receiving zone is incorporated as an integral part of shield protector plate 20. As a result, once protector plate 20 has been mounted in place with arcuately curved section 21 overlying cable 25, shield protector plate 20 is quickly and easily secured in the precisely desired location by merely driving nails, or other fastening members, through apertures 28, securing flange 22 and curve section 21 to the support wall in the precisely desired location.

A further feature incorporated into shield protector plate 20, in the preferred embodiment, are a plurality of slots 30 formed in spaced intervals along the length of shield protector plate 20, positioned substantially at the juncture between arcuately curved section 21 and flange section 22. Although this feature can be eliminated, if desired, it has been found that the incorporation of slots 30 are desirable for enabling an installer to securely fasten cable 25 directly to shield protector plate 20, at various intervals along its length.

In those instances when such fastening is desired, a fastening wire is wrapped about cable 25 and passed through slot 30, and secured thereto, thereby affixing cable 25 directly to shield protector plate 20. In this regard, although any number of slots 30 can be formed in shield protector plate 20, with slots 30 being spaced apart any desired distance, it has been found that a space distance ranging between about 4 and 6 inches is preferred.

In order to ensure that shield protector plate 20 provides the desired deflection of any nail or other fastening member which contacts shield protector plate 20, a strong, nail resistant material is employed for forming shield protector plate 20. Although any desired material meeting these general requirements can be employed, it has been found that galvanized, cold rolled steel represents the preferred material.

In addition to the use of material which is resistant to being pierced by any nail or other fastening member, the material employed should also be formed to deflect the direction of any nail which is being driven into shield protector plate 20. In this regard, in addition to the material being employed, the preferred arcuately curved shape and construction of section 21, as detailed above, plays a major role in assuring and preventing any nail/fastening member from being able to pierce or puncture shield protector plate 20.

In FIGS. 3 and 4, a second embodiment of shield protector plate 20 of the present invention is fully depicted. In this alternate embodiment, shield protector plate 20 comprises arcuately curved section 21 and flange section 22, both of which are constructed in substantially the identical manner detailed above. In addition, this embodiment of shield protector plate 20 also incorporates a second elongated flange section 35 mounted to the opposed end of arcuately curved section 21. As a result, in this embodiment, shield protector plate 20 comprises elongated, longitudinally extending arcuately curved section 21 and elongated, longitudinally extending flange sections 22 and 35 mounted to the opposed ends of arcuately curved section 21.

In addition, in the preferred construction, flange section 35 incorporates a plurality of apertures 28 formed therein, through which any desired nail or other fastening member can be positioned for securing flange 35, along with flange 22, to a desired surface, with arcuately curved section 21 overlying the desired utility cable, conduit, pipe, or tube. In this way, any desired utility cable, conduit, pipe, and/or tube is peripherally surrounded and fully protected from being pierced during installation of any item to an interior wall. In addition, with this embodiment of shield protector plate 20 being employed, added assurance is achieved that shield protector plate 20 is securely mounted in the precisely desired position due to the incorporation of additional elongated flange section 35 which provides added securement of shield protector plate 20 to the support wall.

In this embodiment, all of the features detailed above in reference to the embodiment of FIGS. 1 and 2 are incorporated herein. As a result, the foregoing detailed disclosure is incorporated herein by reference with the numerical descriptions provided above having equal applicability to the embodiment depicted in FIGS. 3 and 4.

In the preferred construction of this embodiment, elongated slots 30 are mounted at the juncture between arcuately curved section 21 and flange section 35. In this way, added convenience is provided for enabling non-metallic, electricity carrying cables 25 to be securely mounted at spaced intervals along the length of shield protector plate 20, whenever such securement is desired. In addition, any other utility carrying tube, conduit, cable, or pipe can also be securely mounted to shield protector plate 20, if desired, using conventional fastening means and slots 30.

It will thus be seen that the objects set forth above, among those made apparent from the preceding description, are efficiently attained and, since certain changes may be made in the above article without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. A shield member construction for protecting utility carrying cables, tubes, pipes, and conduits, said shield member comprising:

A. an elongated, longitudinally extending, arcuately curved section, substantially C-shaped in cross-section, and comprising an overall length ranging between about 2 feet and 4 feet, defining an open, elongated, substantially concave receiving cavity comprising a diameter which enables the utility carrying tubes, cables, pipes, and/or conduits to be peripherally surrounded and protected thereby; and B. a first, elongated, longitudinally extending flange section extending from a first terminating end of the C-shaped arcuately curved section, mounted to the curved section and incorporating a plurality of apertures formed therein at spaced intervals ranging between about 2 and 5 inches and constructed for receiving fastening means to enable the flange and curved section to be securely mounted to a desired surface;

whereby a shield member is achieved which is capable of being quickly and easily mounted in overlying, peripherally surrounding and protecting relationship with any desired utility carrying tubes, pipes, cables and/or conduits for protection thereof, and securely affixed to any desired to support wall.

2. The shield member defined in claim 1 wherein said arcuately curved section is further defined as comprising a diameter ranging between about 0.4 and 1.0 inches.

3. The shield member defined in claim 2, wherein said accurately curved section is further defined as comprising a uniform diameter extending about a major portion thereof.

4. The shield member defined in claim 3, wherein said arcuately curved section further comprises substantially flat wall members extending from both terminating ends of the uniform diameter portion and integrally formed therewith.

5. The shield member defined in claim 1, wherein said shield member is further defined as being formed from galvanized, cold rolled steel.

6. The shield member defined in claim 1, and further comprising:

C. a second, elongated, longitudinally extending flange section
 a) mounted to the curved section along a portion thereof, diametrically opposed from the mounting position of the first flange section, and
 b) incorporating a plurality of apertures formed therein at spaced intervals;

whereby a shield member is achieved which is capable of being quickly and easily mounted over any desired utility carrying cable, tube, pipe, and/or conduit for protection thereof, while also being easily securely affixed to any desired support wall.

7. The shield member defined in claim 6, wherein said shield member further comprises a plurality of elongated slots formed along the length thereof in cooperating association with the arcuately curved section and at least one flange section.

8. The shield member defined in claim 7, wherein said elongated slot is further defined as being formed at the juncture between the arcuately curved section and the flange section.

9. A shield member construction for receiving, peripherally surrounding, and protecting utility carrying cables, tubes, pipes, and conduits associated therewith, while being easily mounted to any desired surface, said shield member comprising:

A. an elongated, longitudinally extending, arcuately curved section, substantially C-shaped in cross-section,
 a. comprising an overall length ranging about 2 feet and 4 feet, defining an open, elongated, substantially concave receiving cavity; and
 b. comprising a diameter ranging between about 0.4 and 1.0 inches for enabling utility carrying tubes, cables, pipes, and/or conduits to be peripherally surrounded and protected thereby; and B. a first, elongated, longitudinally extending flange section extending from a first terminating end of the C-shaped arcuately curved section,
 a. mounted to the curved section, and
 b. incorporating a plurality of apertures formed therein at spaced intervals ranging between about 2 and 5 inches and constructed for receiving fastening means to enable the flange and curved section to be securely mounted to a desired surface.

10. The shield member defined in claim 9, and further comprising:

C. a second, elongated, longitudinally extending flange section
 a) mounted to the curved section along a portion thereof, diametrically opposed from the mounting position of the first flange section, and
 b) incorporating a plurality of apertures formed therein at spaced intervals;

whereby a shield member is achieved which is capable of being quickly and easily mounted over any desired utility carrying cable, tube, pipe, and/or conduit for protection thereof, while also being easily securely affixed to any desired support wall.

11. The shield member defined in claim 10, wherein said shield member further comprises a plurality of elongated slots formed along the length thereof in cooperating association with the arcuately curved section and at least one flange section.

12. The shield member defined in claim 11, wherein said elongated slot is further defined as being formed at the juncture between the arcuately curved section and the flange section.

* * * * *